United States Patent [19]
McMahon et al.
[11] 3,873,970
[45] Mar. 25, 1975

[54] FINGERPRINT IDENTIFICATION APPARATUS

[75] Inventors: Donald H. McMahon, Carlisle; William T. Maloney, Sudbury, Mass.
[73] Assignee: Sperry Rand Corporation, Great Neck, N.Y.

[22] Filed: July 25, 1973
[21] Appl. No.: 382,596

[52] U.S. Cl. .................... 340/146.3 E, 340/146.3 P
[51] Int. Cl. .................... G06k 9/13
[58] Field of Search .............. 340/146.3 E, 146.3 P; 350/3.5, 162 SF, 162 R; 356/71

[56] References Cited

UNITED STATES PATENTS

| | | | |
|---|---|---|---|
| 3,497,704 | 2/1970 | Holmes et al. | 340/146.3 P |
| 3,550,084 | 12/1970 | Bigelow et al. | 340/146.3 P |
| 3,565,565 | 2/1971 | Reid | 340/146.3 P |
| 3,689,772 | 9/1972 | George et al. | 340/146.3 P |
| 3,771,124 | 11/1973 | McMahon | 340/146.3 P |

*Primary Examiner*—Gareth D. Shaw
*Assistant Examiner*—Leo H. Boudreau
*Attorney, Agent, or Firm*—Howard P. Terry

[57] ABSTRACT

Fingerprint identification apparatus including a light source and suitable lenses for directing a light beam sequentially onto discrete segments of a fingerprint and forming a Fourier transform of the instant illuminated segment. A rotatable radially slitted filter or a circularly disposed array of sequentially sampled photodetectors functions to scan about the center of the Fourier transform to determine the angular displacement of the diffraction lobes of each illuminated segment relative to a reference position of the transform and means is provided for converting the angular data to equivalent electrical signals.

7 Claims, 3 Drawing Figures

FINGERPRINT IDENTIFICATION APPARATUS

BACKGROUND OF THE INVENTION

1. Field of the Invention

This invetion relates to coherent optical fingerprint recognition apparatus of the type including a Fourier transform plane scanner for analyzing the unique ridge line structure having generally uniform spacing in discrete segments of a fingerprint.

2. Description of the Prior Art

Prior art exemplary of fingerprint recognition apparatus to which the present invention relates and the advantages accruing from such apparatus are fully explained and disclosed in U.S. Pat. No. 3,771,124 issued Nov. 16, 1973 in the name of D. H. McMahon and assigned to the assignee of the instant invention.

It is well known to those skilled in the art that lines of a pattern such as the ridge lines of a fingerprint produce a Fourier transform or Fraunhofer diffraction pattern characterized by a central undiffracted light spot and one or more diffracted light spots of diminishing intensity proceeding from and symmetrically disposed on opposite sides of the central spot along a line perpendicular to the pattern lines, the spacing between the diffracted spots being inversely proportional to the separation of the pattern lines. Thus, in the case of a fingerprint pattern of the fingerprint, for example, which contains a multiplicity of discrete finite segments having ridge lines at various orientations relative to one another at generally uniform spacings, the resultant Fourier transform of the entire fingerprint consists of one or more substantially circular bands concentrically disposed about the central undiffracted spot. In view of the symmetry of the Fourier transform diffraction pattern, the information content of a 180° sector is similar to that in the remaining 180° sector and each sector therefore contains complete information about the orientation of the ridge lines of the fingerprint.

The apparatus described in the above-mentioned McMahon patent is a coherent optical processor which includes means for illuminating the fingerprint to be identified to produce a Fourier transform of the fingerprint. A rotatable filter having a radially directed slit is disposed in the Fourier transform plane of the processor for angularly scanning the transform to transmit discrete portions thereof sequentially to an image plane of the processor which contains a plurality of photodetectors each corresponding to a discrete segment of the fingerprint. In addition, signal processing means is provided for generating a plurality of signals each of which is representative of the angle between a reference orientation of the scanner and the position thereof at the instant of peak light at the respective photodetectors. Sets of such signals corresponding to known fingerprints are stored for subsequent correlation with similarly produced signals representative of unknown fingerprints for the purpose of effecting identification.

SUMMARY OF THE INVENTION

The present invention is concerned with modifications of the apparatus disclosed in the aforementioned McMahon patent for enabling use of a slit scanner in combination with a single photodetector in place of the plurality of photodetectors located in the image plane of the processor or alternatively of using a plurality of circularly disposed photodetectors in place of the slit scanner in the Fourier transform plane and without the need for photodetectors in the image plane. These modifications are made possible by the provision of means for scanning the light beam which illuminates the fingerprint such that discrete segments of the fingerprint are illuminated in a predetermined sequential order. Operation in this manner causes a Fourier transform to be produced at each instant corresponding only to the segment of the fingerprint which is illuminated at that moment.

In the embodiment of the invention which comprises a single photodetector, the rotatable slit scanner functions in each half revolution to produce a signal representative of the line orientation in the illuminated segment of the fingerprint. Angular scanning in the Fourier transform plane is performed, therefore, for each position of the illuminating beam on the fingerprint until all desired segments thereof have been covered and a signal produced corresponding to each segment. Signals produced in this manner relating to known fingerprint patterns are then stored for correlation with similarly produced signals relating to unknown fingerprints for the purpose of identifying the latter.

In the embodiment of the invention comprising a circularly disposed array of photodetectors in the Fourier transform plane, the angle scanning of the transform is performed electronically by sampling the output of the respective photodetectors in sequential fashion for each position of the illuminating beam on the fingerprint pattern. The sequential sampling of the circularly arranged photodetectors is thus equivalent to the angle scanning performed by the rotatable slit filter.

It should be appreciated that each of the embodiments disclosed herein relating to the present invention is able to operate in a satisfactory manner only because of the provision of means for sequentially illuminating discrete segments of the fingerprint pattern. This is so because a Fourier transform processor is translational invariant, that is the location of a diffraction pattern produced by lines of a prescribed orientation is dependent only on the orientation and spacing of the pattern lines and is independent of the position of the lines in the overall pattern. In other words, similarly oriented lines at different positions produce diffraction lobes at identical angular locations in the Fourier transform plane. It is necessary therefore that only one segment of the pattern be illuminated at each instant and for such condition 180° of the Fourier transform plane must be scanned or sampled before proceeding to illuminate each successive segment of the pattern.

For a more detailed description of the invention, reference should be made to the following detailed description of the preferred embodiments given with reference to the accompanying drawings.

DESCRIPTION OF THE PREFERRED EMBODIMENTS

Figures 1, 2:
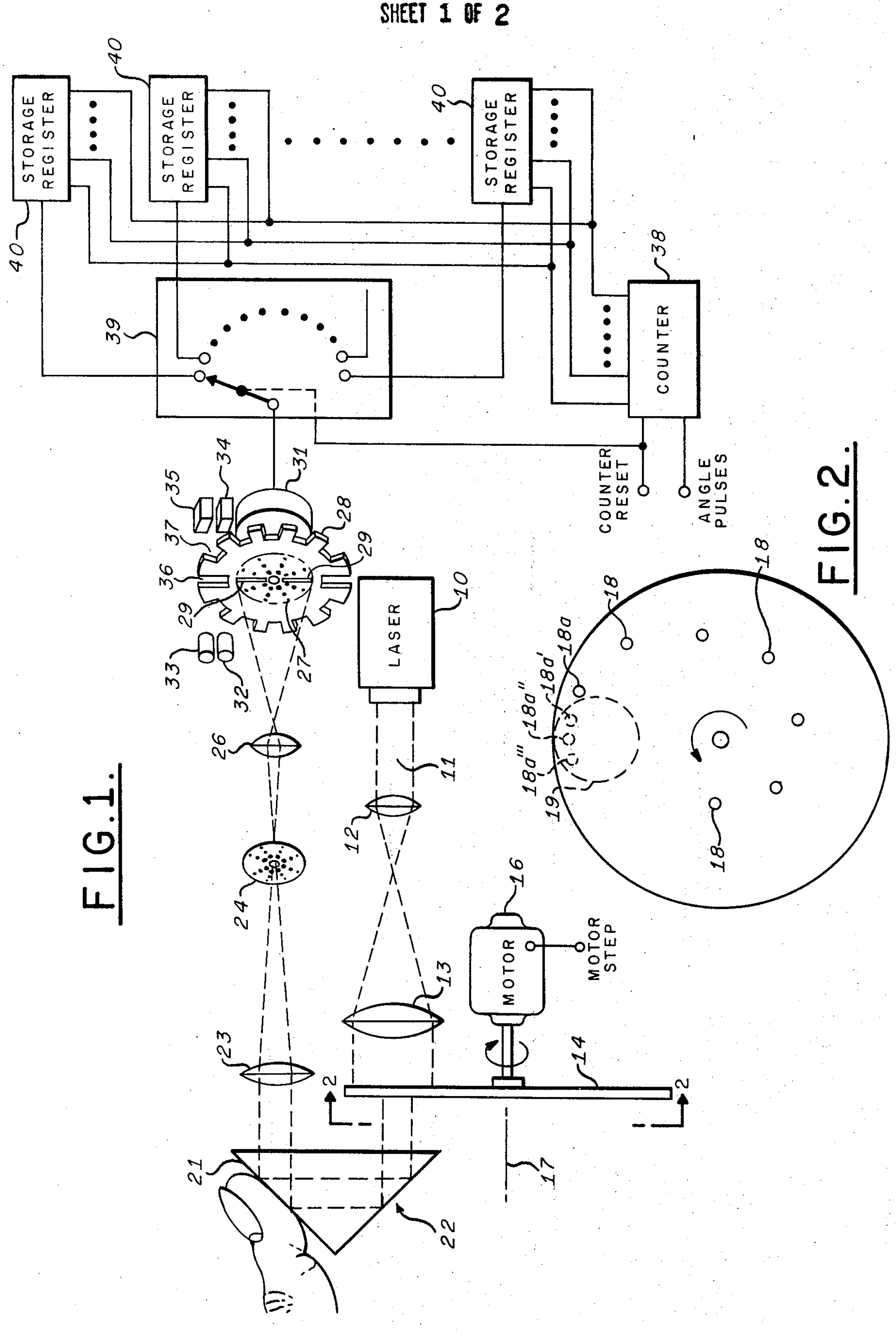
FIG. 1 is a schematic illustration partially in perspective of an embodiment of the invention using a single photodetector and Fourier transform plane slit scanner.
FIG. 2 is a front view taken along lines 2—2 of the fingerprint illuminating element of FIG. 1.

The optical processor apparatus of FIG. 1 comprises a laser 10 which provides a light beam 11 directed through lenses 12 and 13 to produce an enlarged collimated beam propagated onto fingerprint illuminating disk 14 which is driven by motor 16 to rotate about axis 17 in a plane normal to the plane of the drawing. FIG. 2 depicts the spiral array of light transmitting apertures 18 which are formed in disk 14. Dashed line 19 represents the periphery of the expanded light beam incident on the disk. Motor 16 operates to step disk 14 incrementally so that each aperture 18 transmits light to discrete segments of a fingerprint held in contact with surface 21 of input prism 22. Aperture 18*a*, for example, passes light at positions 18*a'*, 18*a''* and 18*a'''* disposed along a generally horizontal line to illuminate respective segments of the fingerprint proceeding into the plane of the drawing for the indicated rotational direction of the motor. The other apertures operate in similar manner for illuminating segments of the fingerprint disposed along other substantially horizontal lines so that a plurality of discrete segments of a two-dimensional array may be illuminated one at a time. The light reflected at surface 21 of the input prism is spatially modulated in accordance with the ridge line pattern of the applied fingerprint as is well understood by those skilled in the art. The spatially modulated beam is transmitted through lens 23 to produce a Fourier transform of the illuminated fingerprint segment at plane 24. Lens 26 serves to produce a magnified Fourier transform at plane 27 where angle scanner 28 is positioned. Scanning is more easily accomplished in the magnified Fourier transform plane. Angular scanner 28 is suitably driven by means such as a circumferential gear or pulley, not shown in the drawing, so as to rotate in plane 27 whereby radially directed slits 29 lying along a diameter of the scanner transmit diffracted lobes of the Fourier transform pattern to detector 31. Light filtering and diffusing means may be included in the processor to permit essentially only light of the wavelength provided by the laser to reach the detector and to spread the laser light over the photosensitive surface of the detector to compensate for non-uniformity of the surface sensitivity.

As explained hereinbefore, the Fourier transform pattern of a fingerprint is characterized by diffraction lobes or spots of light concentrically disposed about a central undiffracted spot as shown in Fourier transform plane 24, where for ease of illustration only the first two diffraction lobes on each side of center have been included. The center undiffracted light spot is representative only of the general size and shape of the fingerprint and thus contains little or no information about the orientation of the ridge lines. Scanner 28 is constructed, therefore, so that the central undiffracted spot is blocked from photodetector 31 and slits 29 transmit only the diffraction lobes corresponding to various ridge lines whereby signal-to-noise ratio is increased. The diffraction lobes produced at any instant lie along a line in the Fourier transform plane oriented normal to the ridge lines of the illuminated fingerprint segment. Inasmuch as the Fourier transform pattern is symmetrical on both sides of the undiffracted central spot, a 180° sector of the Fourier transform must be scanned for each position of the fingerprint illuminating disk 14. Such scanning can be performed with an angular scanner in the Fourier transform plane having a single radial slit but two diametrically opposed radial slits are preferred for further enhancing the signal-to-noise ratio.

Light sources 32 and 33 and detectors 34 and 35 operate in conjunction with apertures 36 and 37 at the periphery of scanner 28 to provide signals representative of the ridge line orientation at the various illuminated segments of the fingerprint in the manner explained in the aforementioned McMahon patent. Briefly, light source 32 and detector 34 provides a signal indicative of each 180 degrees of rotation of the scanner 28 while light source 33 and detector 35 provide a digital count representative of the angular position of the scanner. Counter 38 receives a reset signal from detector 34 each time an aperture 36 intercepts the path between light source 32 and detector 34. Then as scanner 28 continues to rotate, light source 33 and apertures 37 operate to produce light pulses at detector 35 which provides angle pulses to the input of counter 38. Thus, counter 38 always contains a count representative of the angular position of scanner 28 for each 180 degrees of rotation. Each time the counter is reset a step drive signal is applied to motor 16 to illuminate the next fingerprint segment and simultaneously a step drive signal is applied to switch 39 to connect detector 31 to a storage register 40 associated with the illuminated fingerprint segment. Thus, for each position of the motor 16 and switch 39, at the instant the radial slits 29 of the angular scanner 28 intercept the diffraction lobes, corresponding to the illuminated segment of the fingerprint, photodetector 31 provides a trigger signal through switch 39 to the associated storage register 40 whereupon the instantaneous count of the counter is read into the storage register as a digital signal representative of the ridge line orientation of the illuminated fingerprint segment. This operation is repeated until all desired segments of the fingerprint have been inspected to obtain a set of digital signals, each stored in a separate register and each representative of a discrete segment of the fingerprint.

Figure 3:
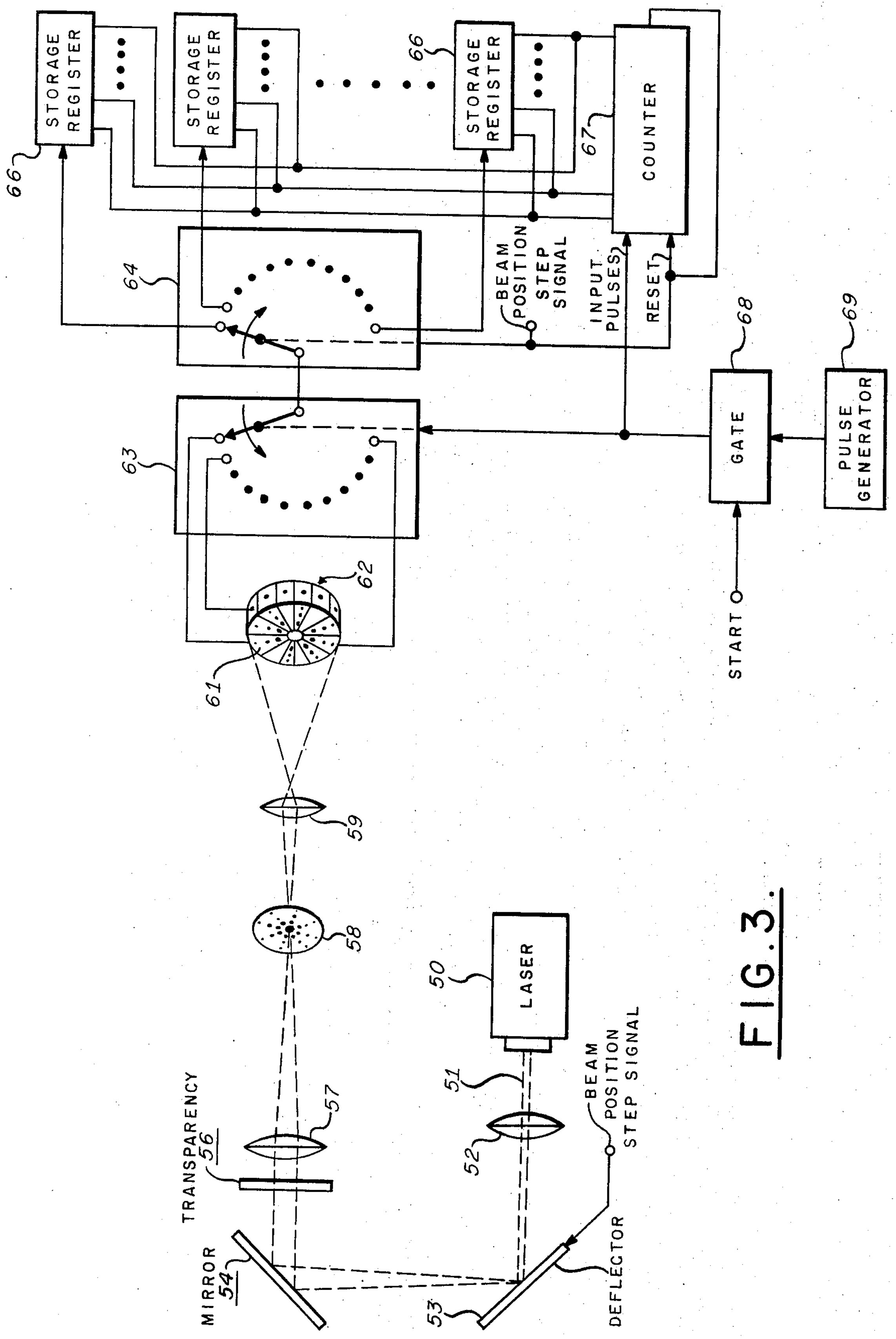
FIG. 3 is a schematic illustration partially in perspective of an embodiment of the invention using a circularly disposed photodetector array in the Fourier transform plane.

The optical fingerprint identification apparatus of FIG. 3 comprises a laser 50 which directs a light beam 51 through a lens 52 onto a two-dimensional light deflector 53 which may be of the piezoelectrically actuated type described in U.S. Pat. No. 3,758,199 issued Sept. 11, 1973 in the name of J. B. Thaxter and assigned to the assignee of the present application. The piezoelectric deflector operates in the manner of the apertured disk of FIG. 1 to illuminate discrete segments of the fingerprint transparency one at a time. The piezoelectric deflector directs the light onto mirror 54 and then through the fingerprint transparency 56 onto lens 57. Mirror 54 and transparency 56 are used in place of the input prism and finger described with reference to the embodiment of FIG. 1, and it will be appreciated that the latter combination could be used in the present embodiment as well, or conversely that the mirror and transparency could be used in the embodiment of FIG. 1. The transparency operates to produce a spatially modulated beam which is focused by lens 57 to produce a Fourier transform diffraction pattern of the transparency in plane 58. The Fourier transform pattern is, of course, of the same general character as shown with reference to FIG. 1. Lens 59 functions to produce a magnified Fourier transform image in plane 61 where a plurality of photodetectors 62 are arranged in a circle about the axis of the apparatus. Rotational motion of the piezoelectric deflector 53 without translational motion at the focal plane of lens 52 causes the image focal point at the Fourier transform plane 58 and magnified Fourier transform plane 61 likewise to remain motionless.

The photodetector outputs are connected to respective taps of stepping switch 63 which in turn couples the photodetectors through stepping switch 64 to associated storage registers 66. In operation of the device, a beam position signal is applied to deflector 53 to illuminate a selected segment of the transparency and switch 64 is simultaneously stepped to a related tap position to enable activation of the storage register associated with the iluminated transparency segment. For purpose of explanation, it will be assumed that counter 67 is initially at zero count and that switches 63 and 64 are at the illustrated tap positions with the transparency in place and the illuminating beam on the first segment of the transparency. A start signal applied to gate 68 applies stepping pulses from pulse generator 69 to switch 63. These stepping pulses drive switch 63 so as to sample the output of each of the photodetectors in sequence and thus perform an angular scan of the magnified Fourier transform at plane 61. As in the case of the embodiment of FIG. 1, the Fourier transform is symmetrical about its center and thus it is necessary to use a number of photodetectors sufficient to cover only a 180 degree sector; but a complete ring of detectors may be used if desired, with the output terminals of diametrically located detectors connected in parallel. At the same time that switch 63 is stepped sequentially through its tapped positions, the stepping pulses from generator 69 are also applied to counter 67 which thereby contains a count indicative of the position of switch 63 corresponding to a discrete angle in the magnified Fourier transform plane. When the contact arm of switch 63 reaches the tap connected to the photodetector located at the position of the Fourier transform diffraction lobes of the illuminated transparency segment, a signal is applied from that photodetector through switch 63 and the active tap of switch 64 to the actuate terminal of the associated storage register 66, to enable the instantaneous count of counter 69 to be stored in the register. Each photodetector typically provides some low level noise output signal and the apparatus is therefore best operated by requiring that a threshold level be exceeded before a storage register is actuated to receive the count. Finally, when the counter reaches a count corresponding to the number of photodetectors in a 180° sector of the Fourier transform plane, a reset pulse is applied from the output back to the input of the counter. The reset pulse is also applied to deflector 53 to move the illuminating beam to the next transparency segment and to switch 64 to couple the contact arm thereof with the next storage register in readiness for cyclicing switch 63 once again to determine the location of the diffraction lobes produced by the instantly iluminated transparency segment. Operation is continued in the foregoing manner until all transparency segments have been illuminated and signals produced in the related storage registers.

While the invention has been described in its preferred embodiments, it is to be understood that the words which have been used are words of description rather than limitation and that changes within the purview of the appended claims may be made without departing from the true scope and spirit of the invention in its broader aspects.

We claim:

1. Optical fingerprint identification apparatus comprising means for supporting a fingerprint to be identified, means for illuminating a discrete segment of said fingerprint and producing a Fourier transform having diffraction lobes corresponding to the ridge lines in said illuminated discrete segment of said fingerprint, means for angularly scanning through 180 degrees about the center of said Fourier transform for producing output data signals representative of the presence and angular position of said diffraction lobes and producing a reset signal indicative of completion of said 180° scan, means coupled to said angular scanning means and responsive to said output data signals for storing said output data representative of the angular position of said diffraction lobes, and means coupled between said illuminating means and said angular scanning means for directing said illuminating means onto a different discrete segment of said fingerprint in response to said reset signal.

2. Optical fingerprint identification apparatus as described in claim 1 wherein said means for angularly scanning through 180 degrees about the center of said Fourier transform includes a rotatable member, first detector means cooperable with said rotatable member for producing an output signal indicative of the presence of diffraction lobes in said Fourier transform, second detector means cooperable with said rotatable member for determining the instantaneous angular position of said rotatable member, and counter means coupled to said second detector means for producing a count corresponding to the instantaneous angular position of said angular scanning means.

3. Optical fingerprint identification apparatus as recited in claim 2 wherein said means for storing is coupled to said first detector means and said counter means and includes separate storage registers corresponding respectively to each illuminated segment of said fingerprint whereby said first detector output signal produced during each 180° scan activates a corresponding storage register and said counter means applies the count corresponding to the instantaneous angular position of said rotatable member to said corresponding storage register.

4. The optical fingerprint identification apparatus as recited in claim 3 wherein said rotatable member includes light obstructing and transmitting sections and said first detector means includes a photodetector for receiving light transmitted through said rotatable member at an angular position of said rotatable member corresponding to the position of the diffraction lobes in the Fourier transform thereby producing an electrical output signal representative of the presence of the diffraction lobes.

5. The optical fingerprint identification apperatus as recited in claim 4 further including multi-position switch means having a plurality of output terminals each coupled to a corresponding trigger input terminal on an associated storage register, said switch means having a common input terminal coupled to said photodetector whereby said electrical output signal representative of the presence of the diffraction lobes is coupled through the switch means to a storage register corresponding to said illuminated segment.

6. The optical fingerprint identification apparatus as recited in claim 5 wherein said second detector means includes means for producing said reset signal and said counter includes a reset terminal coupled to said second detector means and the common terminal of said switch means whereby said switch means sequentially couples said photodetector output signal to a different storage register at the completion of each 180 degrees rotation of said rotatable member and said counter means is simultaneously reset.

7. Optical fingerprint identification apparatus as recited in claim 1 wherein said means for angularly scanning through 180 degrees includes a plurality of detectors contiguously disposed along a semi-circular path about the center of the transform, switch means having a plurality of input and output terminals and a common terminal, said input terminals being coupled to respective photodetectors in said plurality of photodetectors, pulse generator means coupled to said common terminal for sequentially stepping said common terminal to each of said input and output terminals, counter means coupled to said pulse generator means and said common terminal of said switch means for producing a count corresponding to the angular position of the photodetector coupled to the common terminal of said switch means, and said storage means includes separate storage registers, each having an actuate terminal coupled to a corresponding output terminal of said switch means and data input terminals coupled to said count means whereby said counter means applies the count in accordance with the angular position of a photodetector which senses the presence of diffraction lobes to the storage register corresponding to said photodetector.

* * * * *